1 GRAM PRELIMINARY PURIFIED GONADOTROPIC HORMONE (ABOUT 3000 UNITS PER MG); DISSOLVE IN COLD PHOSPHATE BUFFER (PH= 7.5)

- SOLUTION + WASHING. PRECIPITATE WITH AN AQUEOUS SOLUTION OF PROTAMINE (10 MG PROTAMIN PER CCM); LET STAND 2 HOURS AND CENTRIFUGE
- RESIDUE; WASH WITH 10 CCMS PHOSPHATE BUFFER; ADD WASHING TO SOLUTION AND DISCARD RESIDUE

- SOLUTION + WASHINGS ADD A SATURATED SOLUTION OF REINECKE SALT; AND CENTRIFUGE
- PRECIPITATE: WASH TWICE WITH 1 CCM PROTAMINE SOLUTION; ADD WASHINGS TO SOLUTION (DISCARD WASHED PRECIPITATE, INACTIVE)

- SOLUTION DIALYZE FOR 48 HOURS AT 2° C AND FILTER INTO CENTRIFUGING GLASS
- PRECIPITATE (DISCARD)

- FILTRATE CENTRIFUGE; CHILL AND PRECIPITATE WITH TENFOLD STERILE ALCOHOL AT 10° C; LET STAND 24 HOURS AND CENTRIFUGE AT 0° C
- RESIDUE (DISCARD)

- PRECIPITATE WASH WITH STERILE ALCOHOL; DRY WITH STERILE ETHER. SOLIDS 350-400 MGS (8000-8500 UNITS PER MG)
- SUPERNATANT (DISCARD)

INVENTORS
K. E. L. CLAESSON
K. B. HÖGBURG
T. ROSENBERG
BY
Sd Shappirio
ATTORNEY

UNITED STATES PATENT OFFICE 2,603,585

PURIFICATION OF GONADOTROPIC HORMONES WITH A BASIC PROTEIN

Karl Erik Lennart Claesson, Stockholm, Knut Bertil Högberg, Helsingborg, Sweden, and Ernst Thomas Rosenberg, Lundtofte, Denmark, assignors to Aktiebolaget Leo, Helsingborg, Sweden, a firm Application October 8, 1948, Serial No. 53,592
In Denmark October 14, 1947

9 Claims. (Cl. 167—74.5)

It is known that preparations of gonadotropic hormones may be produced from urine of pregnant women or from serum or plasma from pregnant mares by various processes, for example, fractionated precipitation by means of salts or adsorption on a suitable adsorption agent. Moreover, it is known that in the purification process it is possible to take advantage of the fact that certain acids, which are capable of specifically precipitating proteins, for example, picric acids, trichlor-acetic acid or sulphosalicylic acid will be able to precipitate proteins accompanying the hormone without simultaneously precipitating the hormone itself. In this manner a considerable effect of purification can be attained.

This invention has for its object a process of purifying gonadotropic hormones in which a substantially higher degree of purification can be obtained than has hitherto been possible. The accompanying flow sheet illustrates this process of purification.

According to the invention the proteins accompanying the hormone are removed from a solution of the preliminarily purified hormone by precipitation by means of basic proteins such as protamines, histones or proteins which have been treated to make them alkaline in reaction, e. g. by methylation by adjusting the said solution to a suitable pH-value, preferably a pH-value in the vicinity of the neutral point before or after the addition of the said basic proteins to the solution.

If an excess of the basic proteins has been employed this excess may be precipitated by protein-precipitating agents, which do not precipitate the hormone, for example, Reinecke salt, picric acid or trichlor acetic acid after which the hormone is recovered from the solution purified in this manner. Prior to the recovery of the hormone from the solution soluble salts may be removed therefrom, for example, by dialysis.

The raw material from which the preliminarily purified hormone is produced may, for example, be either urine from pregnant women or serum or plasma from pregnant mares. The preliminary purification may be carried out in various manners dependent on the raw materials but when urine from pregnant women is used the preliminary purification consists most advantageously in the adsorption of the hormone on a suitable adsorption agent, splitting up the adsorption complex and redissolving and reprecipitating the hormones. The said redissolving and reprecipitating process may be repeated if required until a raw hormone has been attained the purity of which corresponds to the highest degree of purity which can be attained by using these methods known per se. If the raw material is serum from pregnant mares the preliminary purification may consist in precipitating proteins accompanying the hormone by means of protein-precipitating agents, which will not precipitate the hormone. When the proteins accompanying the hormone have been precipitated as far as possible the hormone is adsorbed from the remaining liquid by means of a suitable adsorbing agent after which the complex of adsorption is split up and the hormone is redissolved and reprecipitated one or several times if so desired.

On the other hand the preliminary purification may also be carried out in other manners known per se, for example, by fractionated precipitation by means of salts or organic precipitating agents miscible with water, for example, alcohol or acetone, the precipitate being redissolved by means of suitable buffers and reprecipitated etc. until a preparation has been obtained which has been deprived of the greater part of the foreign matters occurring together with the hormone in the starting material.

By way of example of the alkaline proteins that can be used according to the invention there may be mentioned histones, protamine and proteins, for example, methylated gelatine, or gelatine or other proteins which have been treated to make them alkaline in reaction, e. g. by methylation in which, for example, the available carboxyl groups or part of such groups are protected by neutral or basic groups, for example, ester groups, so that an alkaline protein is obtained. The manner in which the alkaline protein acts is assumed to be that it forms insoluble compounds with the proteins accompanying the hormone and having their isoelectric point on the acid side of the neutral point. By the formation of these compounds the isoelectric point will change to basic values. On the addition of the alkaline protein the pH-value of the solution of the hormone and the accompanying proteins must therefore be within, or after the addition of the alkaline protein it must be adjusted to, a range within which the insoluble complex thus formed will be precipitated and it has been found that when protamine is used as the alkaline protein the pH-value may most advantageously be 5–7.5. The precipitation by means of protamine is therefore preferably carried out in a solution of the preliminarily purified hormone in a buffer having this pH-value.

Circumstances appear to be similar to those known from the production of insulin preparations of protracted effect by adding protamin or some other alkaline protein to a solution of insulin in order to change the isoelectric point of the insulin to an alkaline pH-value, a compound of the insulin and the alkaline protein being formed. Accordingly in the present process the same alkaline proteins may be used as in the said treatment of insulin.

The addition of the alkaline protein is preferably carried out in the form of a solution therein and so much of this solution is added that no further precipitation takes place upon continuing the addition. If therefore an excess of the alkaline protein has been added it can readily be precipitated since it is well known that a number of specific protein-precipitating agents exist which will not precipitate the hormone itself. Examples of such agents have been mentioned above. This circumstance is essential to the present purification method since it is thereby possible to do away with an eventual excess of the alkaline protein. If desired an excess of the alkaline protein may deliberately be added in order to take advantage of a purification effect exerted in the solution of the hormone by the subsequent precipitating process, but such purification effect does not always occur.

In the solution of the hormone formed in this manner electrolytes are contained which are removed by dialysis or in other manner.

The solution of the hormone will now be pure and in case the gonadotropic hormone has to be used for parenteral application this solution may be sterilized in suitable manner, for example, by passing it through a sterilisation filter. If on the other hand the hormone has to be produced in the solid form it may be precipitated from the solution by means of for example, alcohol which preferably can be used in the sterile condition to obtain a sterile precipitate. After washing and drying the product will be more pure and the hormone more active than hitherto known products. Thus it is possible in this manner to produce chorionic hormone which is more active than the hormone known previously and which proves more homogeneous when subjected to electrophoresis. It is interesting to note that hormone produced in accordance with the present invention has been found crystallisable whereby for the first time a gonadotropic hormone has been produced in the crystalline condition but the crystallising method as such is not an object of the present invention.

The invention will be further illustrated by the following examples but we wish it to be understood that we do not desire it to be limited to the exact details described, for obvious modifications will occur to a person skilled in the art.

*Example 1*

Production of chorionic gonadotropine.

Gonadotropic hormone from urine derived from pregnant women is adsorbed in the known manner upon benzoic acid after which the benzoic acid is dissolved and the hormone is further purified by two precipitations effected by means of alcohol. From the hormone which has been preliminarily purified in this manner and the activity of which is about 3,000 internature units per mg. 1 g. is dissolved in a cold phosphate buffer of pH of which is 7.5. The undissolved residue is washed by means of 10 ccms. of the buffer. To the extract is added an aqueous solution of protamine containing 10 mgs. protein per ccm. until no further precipitation occurs. After standing for 2 hours the mixture is centrifuged and the precipitate is washed twice with 1 ccm. solution of protamine. The wash water is added to the centrifuged solution. The precipitated matter will prove quite inactive.

Now a saturated solution of Reinecke salt is added to the solution which is then centrifuged. The centrifuged solution is dialysed for 48 hours at 2° C. and then filtered down into a sterilized centrifuging glass. The filtrate is centrifuged and the solution is chilled and precipitated by ten times its volume of sterile alcohol at 10° C. After 24 hours the mixture is centrifuged at 0° C. and the precipitate obtained is washed with sterile alcohol and dried with sterile ether and consists now of the pure chorionic gonadotropine hormone. The yield is 350–400 mgs. and the activity is 8000–8500 I. U. per mg. The preparation proves homogeneous when subjected to electrophoresis.

*Example 2*

Production of serum gonadotropic hormone.

2 ls. of serum of pregnant mares are deprived of proteins by precipitation with for example, metaphosphoric acid or Reinecke salt, which will not precipitate the hormone. The solution is adjusted to pH=7 and 500 gs. sodium benzoate are added in the solid form. Thereafter the solution is diluted by hydrochloric acid with stirring until pH reaches 4.6 and the precipitate formed is removed from the solution after standing for 3 hours at 0° C.

The precipitate of benzoic acid is then further treated as stated in Example 1 and purified with protamine under the same conditions. Also in this case the preparation obtained proves homogeneous on electrophoresis.

*Example 3*

Chorionic gonadotropic or serum gonadotropic hormone.

In the purification of chorionic gonadotropic or serum gonadotropic hormone according to Examples 1 and 2 respectively gelatine which by complete methylation by means of for example, dimethylsulphate has had its isoelectric point placed on the basic side of the neutral point is used in place of protamin.

The excess of the precipitating agent is then removed as in the case of protamin for example, by means of Reinecke salt.

The further purification is carried out exactly as stated in the Example 1 or 2 and with the same result.

*Example 4*

Chorionic gonadotropic or serum gonadotropic hormone.

As in Example 3 with the exception that histone sulphate is used for the precipitation in place of methylated gelatine.

We claim:

1. In a process of purifying gonadotropic hormones the step of treating an aqueous solution of said hormones in a preliminary purified state with a basic protein at a pH in the vicinity of the neutral point to precipitate undesired proteins accompanying the hormone.

2. A process as set forth in claim 1 in which the basic protein is a protamine.

3. A process as set forth in claim 1 in which the basic protein is a histone.

4. A process as set forth in claim 1 in which the basic protein is a protein which has been treated to make it alkaline in reaction.

5. A process as set forth in claim 1 in which an excess of said basic protein is added, and said excess of said basic protein is precipitated by a protein precipitating agent selected from the group consisting of Reinecke salt, picric acid and trichloracetic acid.

6. In a process of purifying gonadotropic hormones as set forth in claim 1, the step comprising dissolving the preliminary purified hormone in a buffer with a pH value in the vicinity of the neutral point.

7. A process of purifying gonadotropic hormones comprising the steps of dissolving the preliminary purified hormone in a phosphate buffer, the pH value of which is in the vicinity of the neutral point, and mixing said solution with a solution of protamine, removing the precipitate, and separating the hormones from the solution by precipitation with alcohol.

8. A process of purifying gonadotropic hormones comprising the steps of dissolving the preliminary purified hormone in a phosphate buffer, the pH value of which is in the vicinity of the neutral point, and mixing said solution with a solution of histone, removing the precipitate, and separating the hormones from the solution by precipitation with alcohol.

9. A process of purifying gonadotropic hormones comprising the steps of dissolving the preliminary purified hormone in a phosphate buffer, the pH value of which is in the vicinity of the neutral point, and mixing said solution with a solution of a protein which has been treated to make it alkaline, removing the precipitate, and separating the hormone from the solution by precipitation with alcohol.

KARL ERIK LENNART CLAESSON.
KNUT BERTIL HÖGBERG.
ERNST THOMAS ROSENBERG.

REFERENCES CITED

The following references are of record in the file of this patent:

UNITED STATES PATENTS

| Number | Name | Date |
|---|---|---|
| 2,007,328 | Cole | July 9, 1935 |
| 2,312,901 | Hartmann | Mar. 2, 1943 |

OTHER REFERENCES

Chow, "The Purification and Properties of Certain Hormones," in Advances in Protein Chemistry, volume 1, 1944, pages 153 to 185, pages 156 to 161, 166 to 167, 176 to 180 relied on.

Pincus, "The Hormones," volume I, 1948, pages 638, 645, 651 to 653.

Gustus in J. Biol. Chem., May 1936, volume 114, page 63.

Lundgren in J. Biol. Chem., January 1942, pages 367 to 370.

Katzman in J. Biol. Chem., March 29, 1943, volume 148, pages 501 to 507.

Cartland in J. Biol. Chem., June 1937, pages 59 to 67.

Hawk, "Practical Physiological Chemistry," 1947, 12th edition, pages 152, 157, 158 and 169.